United States Patent
Cohen et al.

(10) Patent No.: US 7,254,389 B2
(45) Date of Patent: Aug. 7, 2007

(54) WIRELESS LINK SIMULATION WITH GENERIC CACHING

(76) Inventors: Alain J. Cohen, 3101 New Mexico Ave., Washington, DC (US) 20016; Jerome Plun, 5901 Mt. Eagle Dr., Alexandria, VA (US) 22303; Yevgeny Gurevich, 1710 Lanier Pl., NW., Washington, DC (US) 20009

( * ) Notice: Subject to any disclaimer, the term of this patent is extended or adjusted under 35 U.S.C. 154(b) by 235 days.

(21) Appl. No.: 10/821,558

(22) Filed: Apr. 9, 2004

(65) Prior Publication Data
US 2005/0048964 A1  Mar. 3, 2005

Related U.S. Application Data

(60) Provisional application No. 60/497,713, filed on Aug. 25, 2003.

(51) Int. Cl.
*H04Q 7/20* (2006.01)
(52) U.S. Cl. .................. 455/423; 455/67.11; 455/226.1
(58) Field of Classification Search ............. 455/414.1, 455/67.11, 420, 61.12, 423, 446, 500; 370/338
See application file for complete search history.

(56) References Cited

U.S. PATENT DOCUMENTS 5,740,468 A * 4/1998 Hirose .................. 710/57

* cited by examiner

*Primary Examiner*—Temica Beamer
(74) *Attorney, Agent, or Firm*—Robert M. McDermott, Esq.

(57) ABSTRACT

A simulation system includes a cache structure that stores determined characteristics related to the propagation of an event. If a similar event occurs, and the factors affecting the determination of these characteristics have not changed, the characteristics associated with the new event are retrieved from the cache, rather than being re-determined from the underlying factors. In the example of mobile transceivers, if multiple transceivers share a common set of underlying factors, the determined characteristics of one transceiver can be shared among all of the other transceivers. If the underlying factors are dependent upon geographic area, mobile transceivers that enter a geographic area having associated cached characteristics can use the cached characteristics of other transceivers that are, or had been, in the area. Because the cache process is structured to intercept a call to the routine that determines the characteristics, the modifications to a simulation system to incorporate this caching feature should be minimal.

27 Claims, 2 Drawing Sheets

WIRELESS LINK SIMULATION WITH GENERIC CACHING

This application claims the benefit of U.S. provisional patent application No. 60/497,713, filed 25 Aug. 2003.

BACKGROUND AND SUMMARY OF THE INVENTION

This invention relates to the field of simulation systems, and in particular to a network simulator that is configured to model wireless networks.

The simulation of networks to predict performance, identify bottlenecks, assess possible changes, and so on, is common in the art. In wired networks, parameters such as propagation delay, error rates, reliability, and so on, are fairly constant for a given communications link. In a wireless network, however, such parameters can vary substantially with time, particularly in a wireless network with mobile transceivers. The simulation of wireless transmissions requires, for example, the computation of a set of characteristics to determine whether a communication can take place between a transmitter and receiver, including, for example, the current distance between the transmitter and receiver, interference between the transmitter and receiver, the current power level of the transmitter, and so on. These characteristics also affect the determination of whether the receiver obtains a valid copy of the transmission, the degree of interference on other communications caused by the transmission, and other factors that are used to assess the overall performance of the network.

The conventional simulation of a system is accomplished by generating sample events, then propagating each event from node to node in the system. That is, for example, consider an event that is a new message generated at node A and addressed to node B. Consider, also that node X is between nodes A and B. The transmitted message from node A is simulated as arriving at node X at some time after its transmission from A, then simulated as being processed by node X, incurring, for example, a queuing delay at node X, and a subsequent transmission to node B at a following time. The transmitted message from node X is simulated as arriving at node B at some time later, processed at node B, including queuing or other delays, as appropriate. By propagating the message in this manner, the total delay time from transmission at node A to completed reception at node B can be determined. Other phenomena can also be modeled. For example, random requests for retransmissions can be generated based on simulated noise levels, increasing queue delays can be simulated based on increased traffic, and so on. In like manner, the models of each node can be changed to determine the effect of the change on the system performance. For example, the propagation delay time between node A and B can be determined as a function of the size of buffers, or the type of processor, at node X, to determine whether changes should be made at node X.

Because simulation is an iterative process of propagating simulated events and subsequent internal events caused by the simulated events, a simulation of a moderately complex network can be extremely time consuming. An increase in the time required to simulate the propagation an event at a node can have a substantial effect on the time required to simulate a system. Because each transmission at a wireless node requires the aforementioned determination of potentially changing characteristics, the simulation of a wireless network is generally significantly slower than the simulation of a similar-size wired network.

It is an object of this invention to reduce the time required to simulate a wireless network. It is a further object of this invention to reduce the time required to simulate a wireless network without substantially modifying the structure of a conventional simulation system.

These objects, and others, are achieved by a simulation system that includes a cache structure that stores determined characteristics related to the propagation of an event. If a similar event occurs, and the factors affecting the determination of these characteristics have not changed, the characteristics associated with the new event are retrieved from the cache, rather than being re-determined from the underlying factors. In the example of mobile transceivers, if multiple transceivers share a common set of underlying factors, the determined characteristics of one transceiver can be shared among all of the other transceivers. If the underlying factors are dependent upon geographic area, mobile transceivers that enter a geographic area having associated cached characteristics can use the cached characteristics of other transceivers that are, or had been, in the area. Because the cache process is structured to intercept a call to the routine that determines the characteristics, pass the call to the routine if the characteristics have not yet been determined for the given set of underlying factors, and store the results from the routine for potential subsequent use, the modifications to a simulation system to incorporate this caching feature should be minimal.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

The invention is presented in the context of a simulation system for wireless communication networks, because of the efficiencies that are realized in this application. Specifically, when simulating wireless communications where terrain effects play a role in determining the simulated effects of a communication, if long or moderate distances separate the receiver and transmitter, that minor differences in location of said transmitter and receiver do not play a substantial role in affecting the results. If the transmitter and receiver, for example, are separated by a few kilometers and the granularity of terrain information available to most simulators is on the order of meters or tens of meters, objects within the same "region" that communicate with objects in another region can "reuse" the terrain profile and effects of the terrain on the communication without substantial loss of accuracy.

A preferred embodiment of this invention takes advantage of the above observation by allowing nodes in a cluster to share the terrain information derived from a first communication out of that cluster. The reuse of results is appropriate because even if the nodes are slightly separated from each other (or will be once one or more enter a particular region), the results are likely to be sufficiently accurate for the purposes of the simulation.

One of ordinary skill in the art will recognize, however, that the clustering and regions detailed in this disclosure do not necessarily need to correspond to geographic location, but such a geographic mapping is likely to be common in the simulation of wireless networks. One of ordinary skill in the art will also recognize that the principles of this invention can be applied to potentially improve the simulation system by caching the results of other complex processes that are frequently invoked with common sets of input parameters. Similarly, one of ordinary skill in the art will recognize that the caching process described hereinafter can be selectively disabled within the simulation system, to avoid the overhead incurred by the caching process when the situation being simulated is not expected to produce invocations of the process with common sets of input parameters.

Figure 1:
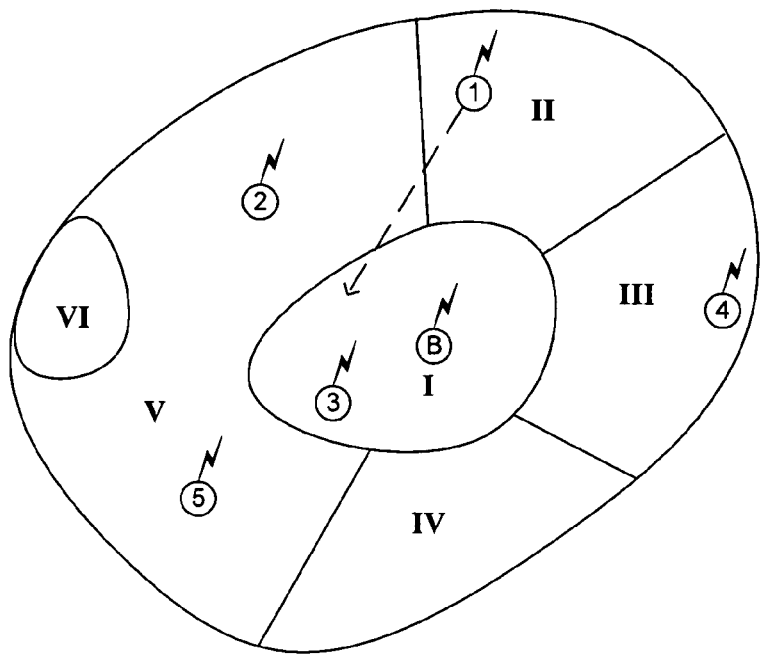
FIG. 1 illustrates an example model of a wireless network for simulation using the principles of this invention.

FIG. 1 illustrates an example model of a wireless network for simulation using the principles of this invention. In the example network, a base station B is configured to communicate with mobile transceivers 1–5. This structure is presented for ease of understanding, and it will be evident to one of ordinary skill in the art that this invention is not limited to a network with a stationary base station.

Illustrated in FIG. 1 are regions I–VI. These regions I–VI are intended to represent geographic regions relative to the base station B. In the context of this invention, each region represents an area within which receptions from base station B exhibit similar characteristics. For example, the characteristics of receptions at transceivers 2 and 5, each in region V, are assumed to be substantially equivalent. The asymmetric nature of these example regions represent the irregularity of a base station's reception due to terrain, obstructions, reflections, and so on; in an easier-to-implement embodiment, regular and/or algorithmically determined regions can be defined, such as a grid structure, concentric rings, and so on.

FIG. 1 illustrates, via the dashed arrow, a motion of the transceiver 1 from region II, through region V, and into region I. In the context of this invention, this is a simulated motion of a hypothetical transceiver 1 in the vicinity of a modeled base station B; however, for ease of presentation, the adjectives "simulated" and "hypothetical" will not be explicitly stated, except as required for clarity.

While the transceiver 1 is in region II, each of its communications with the base station B are assumed to be characteristically similar; while transceiver 1 is in region V, each of its communications with the base station B are assumed to be characteristically similar to the communications between transceivers 2 and 5 and the base station B; and while in region I, characteristically similar to the communications between transceiver 3 and the base station B.

Because each of the regions are defined as regions of similar characteristics relative to the base station B, once a first communication with base station B occurs within a given region with a particular set of factors (such as transmit power, message length, and so on), and the effects of that communication determined (such as the likelihood of success, received noise level, propagation delay time, and so on), these same effects can be assumed to occur when another communication with a substantially similar set of factors occurs.

In accordance with this invention, the effects of each first occurrence of a simulated communication within a region with a particular set of factors are stored in a cache. Thereafter, when another communication within the same region with the same set of factors is simulated to occur, the effects of this communication is read from the cache. Assuming that retrieval of the effects from cache can be accomplished within the simulator more quickly than the original determination of the effects, substantial time savings can be achieved, due to the iterative nature of simulation systems. The overall time savings that will be achieved, however, is this cache-retrieval time savings less the overhead required to create and maintain the cache, including the time required to store each first communication to the cache.

Note that the region within which the communication occurs can be considered as yet another factor of the communication between each transceiver and the base station B. In like manner, the communication profile of the base station B that defines each of the regions I–VI can be consider another factor of the communication between each transceiver and the base station B, or any base station having a similar profile. Thus, in accordance with this invention, the effects of each first communication between a transmitter and receiver with a particular set of underlying factors are stored in cache, so that if another communication between a transmitter and receiver with similar underlying factors is to be simulated, the effects will be read from the cache, rather than re-determined.

Any of a variety of techniques can be used to determine whether the underlying factors of two communications are similar-enough to use the cached effects from one communication as the effects for the other communication. In one embodiment of this invention, the similarity of the devices used for the communication provides a first-level determination of whether the communications may be occurring with similar underlying factors. That is, in this embodiment of the invention, the effects of a first communication between a transmitter and receiver with a particular set of factors are stored in cache, so that if another communication between a 'similar' transmitter and a 'similar' receiver occurs with a similar set of factors, the effects can be retrieved from cache. This embodiment effectively provides a hierarchical structure for determining whether two communications are similar: if the transmitters of each communication are not similar, or if the receivers of each communication are not similar, then the effects of each communication will not be assumed to be similar, regardless of the other factors that affect the communications. Further, or alternative, hierarchical structuring may be employed, such as a hierarchy based on transmit power levels. That is, if the transmit power levels of two communications are not similar, the effects of the communications are not assumed to be similar, regardless of the remaining factors that affect the communications.

The term "clustering" is often used to determine and/or define similarities among objects or parameters, and the prior art is replete with techniques for clustering similar items. Numeric parameters, for example, may be clustered by comparing the distance between different sample values relative to the overall variance of the all the sample values, closely spaced values being considered members of the same cluster. Quantizing, rounding, and other techniques that provide a common value to closely valued samples are also commonly used to define clusters of values. Note that as used in this application, the term quantizing is used to define a mapping of a set of ranges of values to a set of nominal values, without limitation on the techniques used to effect the mapping.

Different transmitters that have similar transmission characteristics can be clustered as one of a plurality of transmitter clusters, and different receivers that have similar reception characteristics can be clustered as one of a plurality of receiver clusters. Similarly, the same transmitter having adjustable transmission characteristics, such as different transmit power options, can be a member of a variety of clusters, depending upon the given transmit power level; and the same receiver being in different transmitter regions can be a member of a variety of clusters, depending upon its current location.

In a preferred embodiment of this invention, transmit clusters and receive clusters are defined such that communications from any transmitter within a given transmitter cluster to any receiver within a given receiver cluster will exhibit the same effects as any other communication from the given transmitter cluster to the given receiver cluster. The transmit clusters include the aforementioned underlying factors that are related to the transmitter, and the receive clusters include the factors that are related to the receiver, optionally including cross-factors related to both the transmitter and receiver, such as the location of the receiver relative to the location of the transmitter. Note that by mapping individual transmitters and receivers to corresponding transmitter clusters and receiver clusters, the caching complexity is substantially reduced, compared to caching communications among individual transmitter-receiver pairs.

Preferably, the size of each cluster, and therefore the variability of factors within each cluster, is controllable by the user to achieve a desired tradeoff between simulation efficiency and simulation precision. If each cluster of 'similar' factors encompasses a wide range of factors, the number of different factors that need to be simulated and cached are reduced, but the ability to distinguish the individual effects of each factor is correspondingly reduced. Conversely, if the range of factors constituting a cluster of 'similar' factors is narrow, the effects of each factor that forms a new cluster can be determined, but each of these dis-similar factors must be simulated and cached when they first occur. Additionally, each of these narrowly defined clusters will consume space in the cache.

Figure 2:
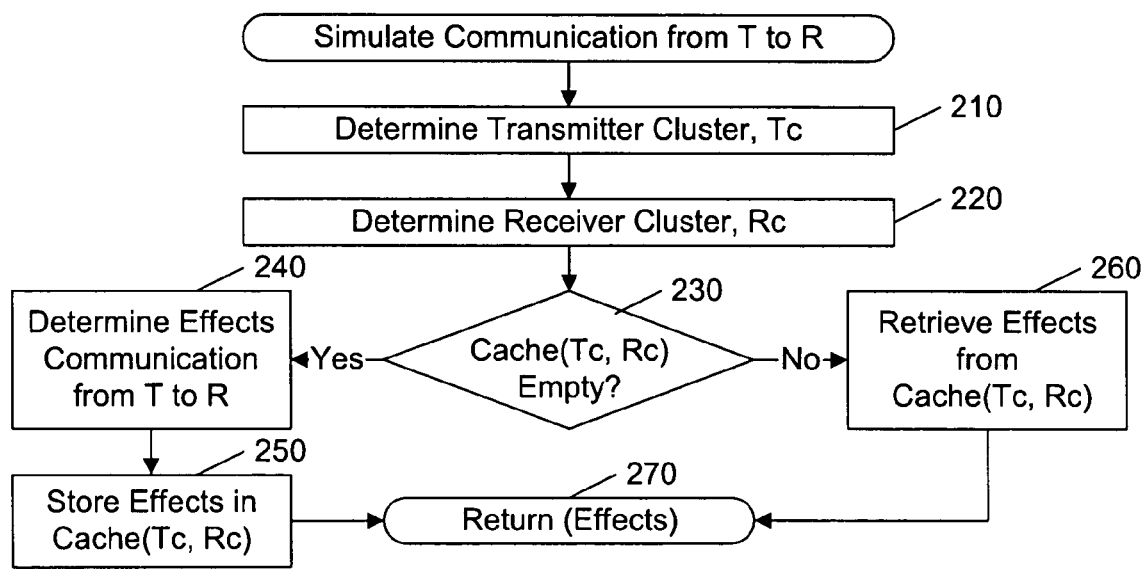
FIG. 2 illustrates an example flow diagram of a cache controller for simulating a communication network in accordance with this invention.

FIG. 2 illustrates an example flow diagram of a cache controller for simulating a communication from a transmitter T to a receiver R, in accordance with this invention. At 210, the transmitter cluster Tc to which the transmitter T belongs is determined. As noted above, this determination may be static or dynamic, including, for example, the current transmit power, the current transmitter location, and so on. Similarly, at 220, the receiver cluster Rc to which the receiver R belongs is determined. As also noted above, this determination may also be based on information related to the transmitter T, or the transmitter cluster Tc, such as the receiver's location relative to the transmitter T, such as the aforementioned regions of substantially equal reception characteristics. By categorizing the transmitter and receiver in this manner, the particular communication is categorized within a finite set (Tc, Rc) of underlying factors, to facilitate the storage and retrieval of characteristics corresponding to each transmitter-receiver cluster in a cache. As noted above, other means of organizing/quantizing the particular transmission-reception factors to facilitate the storage of characteristics corresponding to the factors that are used to determine the characteristics of the communication may be used. For example, rather than defining different transmit clusters corresponding to each quantized transmit power, and different receiver clusters corresponding to each receiver region relative to the transmitter, a four-tuple (Tc', P, Rc', G) may be used to categorize the transmission event, wherein Tc' is a transmit cluster independent of transmit power, P is the transmit power, Rc' is a receiver cluster independent of receiver zone, and G is the receiver region relative to the location of the transmitter.

At 230, the cache is checked to see if characteristics are currently stored in the cache corresponding to transmitter-receiver clusters Tc, Rc; or, in the alternative example above, corresponding to the four-tuple (Tc', P, Rc', G), or whatever categorization of the multiple factors underlying the event is used to facilitate cache management.

The characteristics of the simulation of an event are referred to as "effects" in FIG. 2 for ease of illustration and understanding, because generally the characteristics of a transmission from a transmitter to receiver correspond to whether the communication is successful, whether a retransmission is to be requested by the receiver, and so on. Alternatively, the characteristics may include parameters such as a likelihood of a successful communication, an estimate of bit-error-rate, or other parameters that can subsequently be used to determine the effects of the simulated communication.

If, at 230, the cache does not contain the characteristics corresponding to a transmission from a transmitter in cluster Tc to a receiver in a cluster Rc, the characteristics are determined, at 240. These characteristics may be based on the particular factors of the transmission from transmitter T to receiver R, or based on nominal/quantized factors associated with the clusters Tc and Rc, at 240. The block 240 corresponds to the simulation of a communication from a given transmitter to a given receiver as performed in a conventional simulator. At 250, the determined characteristics are stored in the cache, as the characteristics associated with a transmission from a transmitter in cluster Tc to a receiver in cluster Rc.

If, at 230, the cache contains characteristics corresponding to a transmission from a transmitter in cluster Tc to a receiver in a cluster Rc, the characteristics are retrieved from the cache, at 260. In this way, the time required to 'simulate' each communication after the first communication from Tc to Rc is dependent upon the time required to retrieve the characteristics from the cache, rather than the time required to actually simulate the characteristics of the communication. Note that in a typical simulation of a wireless network, the simulated movement of each mobile device is relatively slow relative to the transmission rate; thus, the likelihood of a mobile device being repeatedly mapped to the same cluster is relatively high. Therefore, by using this invention, the conventional repeated simulation of the mobile device to determine the effects of each successive communication is avoided and replaced by repeated retrievals of the effects from the cache. Additionally, as noted above, by increasing the range of factors that are mapped to the same cluster, the number of successive communications that are retrieved from the same cache can be increased.

At 270, the characteristics/effects corresponding to the simulation of a communication from transmitter T to receiver R are returned for subsequent processing by the simulation system, regardless of whether the characteristics/effects were conventionally simulated or retrieved from cache. In this manner, the modifications required to a conventional simulator to embody this invention, are minimal.

Although the example flow diagram of FIG. 2 corresponds to a simulation/caching of a transmission from a transmitter to a receiver, and is particularly applicable to the simulation of a wireless network wherein the determination of the characteristics/effects of the transmission is time-consuming, one of ordinary skill in the art will recognize that this invention can be employed for the simulation of any event, provided that the event can be characterized by a finite set of parameters. To achieve the efficiencies of this invention, the types of events that are cached are events that typically require substantial time to process to determine the characteristics/effects, compared to the time required to store and retrieve these characteristics/effects in a cache.

Figure 3:
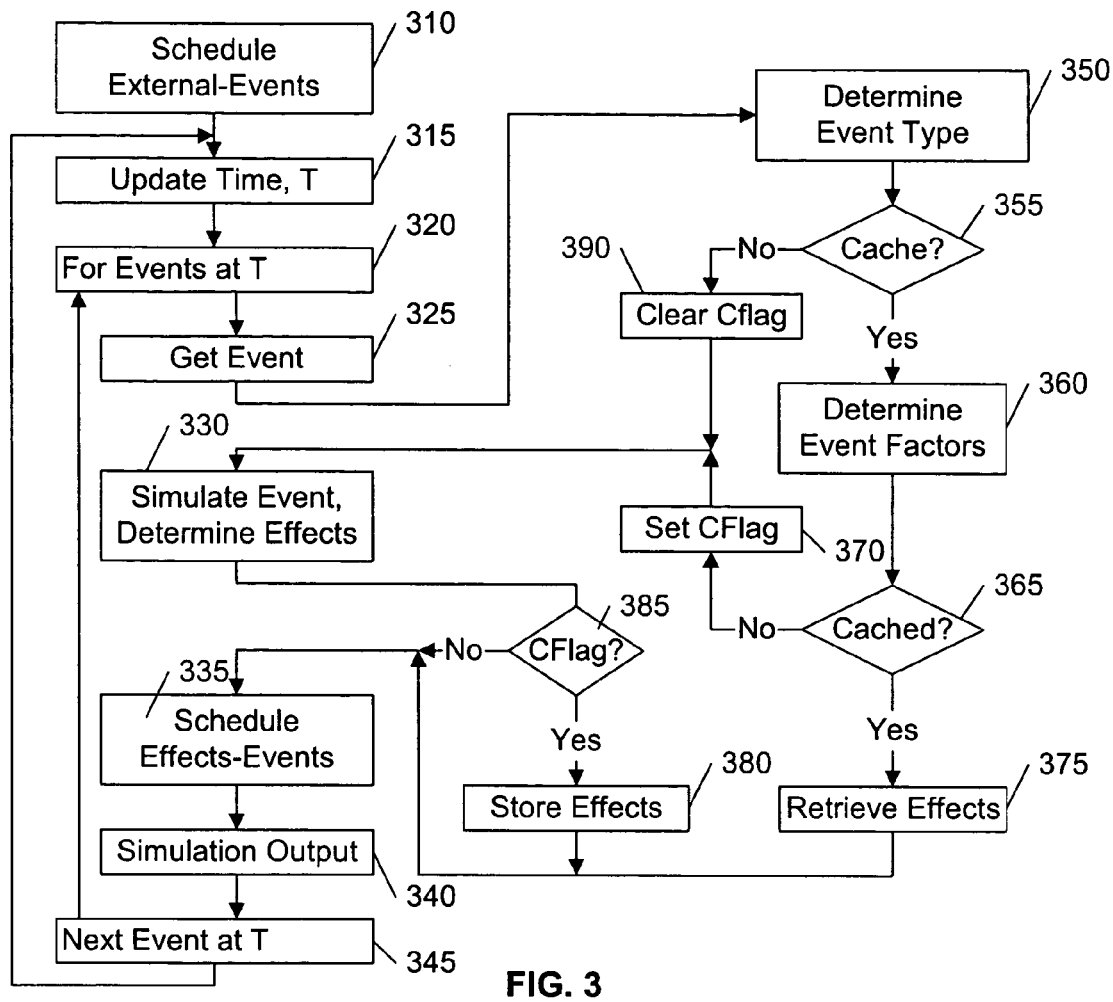
FIG. 3 illustrates an example flow diagram of a simulation system in accordance with this invention.

FIG. 3 illustrates an example flow diagram of a simulation system in accordance with this invention, wherein the cache system is not exclusively limited to the simulation/caching of communications in wireless networks.

The typical flow of a conventional simulator is illustrated in the blocks 310–345; other simulator-flow processes may also be used. At 310, the external events that are being simulated to determine the performance of the simulated network are scheduled to occur at given "simulation times". This simulation time is progressively advanced, at 315. At the given simulation time, all of the events that have been scheduled to occur at this time, whether externally generated or internally generated as the effects of the external events, are simulated in the loop 320–345. The event is retrieved from a scheduler at 325, then simulated at 330 to determine the effects produced by this event at this time. The effects produced by the event generally occur at some defined time after the occurrence of the event. These effects are scheduled to be processed by the simulation system at the future simulation-times, at 335; these are the aforementioned internally generated effects that are retrieved from the scheduler at 325 at their scheduled simulation times.

At 340, any simulation-specific outputs are provided, such as values to be presented on a simulated timing diagram, values that are stored for subsequent processing by other processes, and so on. At 345, the loop 320–345 is repeated to simulate all events that are scheduled for this simulation-time, and when all of the events for this time are simulated, the flow returns to block 315, wherein the simulation-time is advanced to the next scheduled externally generated or internally generated event.

The blocks 350–390 illustrate the addition of the principles of this invention to a conventional simulation system's flow 310–345. As each new event is to be simulated, the event is checked, at 350, to determine if it is a type of event for which caching is provided. As noted above, caching is particularly well suited for events such as the transmission of a communication in a wireless network; however, the principles of this invention can be applied to other simulated events as well.

If, at 355, the event is not an event-type for which caching is provided, the process returns to the conventional simulation flow, at 330, after clearing a cache-flag, at 390. At 330, the event is simulated, and the flow progresses to 385. Because the cache-flag has been cleared, the process returns to the conventional simulation flow, at 335. As can be seen, the invention allows non-cached events to be processed substantially as they would be in a conventional simulator, and introduces very little overhead to these non-cached events.

If, at 355, the event is an event-type for which caching is provided, such as a transmission in a wireless network, the underlying factors that determine the characteristics/effects of the event are determined at 360. As noted above, these factors are preferably quantized or categorized for ease of cache management. For example, the multiple factors that affect a transmission in a wireless network may be categorized as a transmission from a transmitter of a given transmitter-cluster to a receiver of a given receiver-cluster.

If, at 365, the cache is empty for the given categorized event, the processing returns to the conventional simulation flow to simulate the event, at 330, after setting the cache-flag, at 370. After simulating the event at 330, the flow continues at 385, wherein the cache-flag is checked to determine if this simulated event is a newly simulated cacheable event. If the cache-flag is set, the simulated characteristics/effects of the event are stored in the cache, at 380, and the process returns to the conventional flow, at 335.

If, at 365, the cache is not empty for the given categorized event, indicating that the characteristics/effects of the event have already been determined and stored in the cache, these characteristics/effects are retrieved from the cache, at 375, and the process returns to the conventional flow, at 335, thereby bypassing the simulation of the event at 330. Because of the iterative nature of simulation, if the categorizing of the event at 360 and the subsequent retrieval of the characteristics corresponding to the event at 375 are less time-consuming than the simulation of the event, at 330, substantial time savings can be achieved.

In a preferred embodiment of this invention, conventional cache-management techniques are employed to optimize the performance of the cache and/or to minimize the overhead associated with cache access. In like manner, conventional cache-management techniques are used to manage the size of the cache, including clearing the cache of 'stale' information, or infrequently accessed information, to make room for newer information, and so on.

Figure 4:
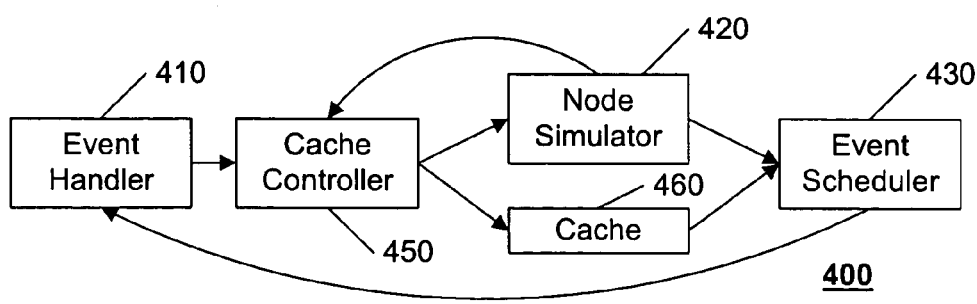
FIG. 4 illustrates an example block diagram of a simulation system with cache in accordance with this invention.

FIG. 4 illustrates an example block diagram of a simulation system 400 in accordance with this invention. The simulation system 400 includes all of the elements of a conventional simulation system, such as input and output components, analysis components, and the like, but only the 'core' elements are illustrated in FIG. 4. These core elements are the event handler 410 that processes the scheduled events to determine which nodes to simulate, the node simulator 420 that simulates the event at a node, and the event scheduler 430 that schedules the events produced by the node simulator 430.

In accordance with this invention, a cache controller 450 and associated cache memory 460 is provided to intercept the conventional communications between the event handler 410 and the node simulator 420. The cache controller 450 is configured to store the results of a simulation of an initial event having certain underlying factors to the cache memory 460, and providing these results to the event scheduler 430 from the cache memory 460 whenever another event having the same underlying factors occurs, using, for example, the flow diagram of FIG. 3, discussed above.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise; and
h) no specific sequence of acts is intended to be required unless specifically indicated.

We claim:

1. A simulation system comprising:
an event handler that is configured to determine occurrences of events,
a node simulator that is configured to simulate each event to determine one or more characteristics associated with the occurrence of the event,
a cache that is configured to store the one or more characteristics associated with the occurrence of select events, and
a cache controller that is configured to determine whether:
to invoke the node simulator to determine the one or more characteristics associated with a subsequent event or
to retrieve the one or more characteristics associated with the subsequent event from the cache.

2. The simulation system of claim 1, wherein the select events correspond to communications from a transmitter to a receiver in a wireless network.

3. The simulation system of claim 2, wherein:
the cache controller is further configured to:
determine a transmitter cluster associated with the transmitter,
determine a receiver cluster associated with the receiver; and
the cache is configured to store the one or more characteristics based on the transmitter cluster and the receiver cluster.

4. The simulation system of claim 3, wherein the cache controller determines the transmitter cluster and the receiver cluster based upon factors associated with the event.

5. The simulation system of claim 3, wherein the receiver cluster is determined based upon a location of the receiver relative to a location of the transmitter.

6. The simulation system of claim 3, wherein the transmitter cluster is determined based upon an output power of the transmitter.

7. The simulation system of claim 1, wherein;
each event includes factors that influence the determination of the one or more characteristics, and
the cache is configured to store the one or more characteristics based on the factors.

8. The simulation system of claim 1, wherein:
each event includes factors that influence the determination of the one or more characteristics,
the cache controller is further configured to determine a category associated with the event based on the factors, and
the cache is configured to store the one or more characteristics based on the Category.

9. The simulation system of claim 8, wherein the cache controller determines the category based on a quantization of one or more of the factors.

10. The simulation system of claim 8, wherein the cache controller determines the category based on a defined range of one or more of the factors.

11. A simulation method comprising:
determining an event to be simulated; and
if a similar event has been simulated previously:
retrieving characteristics associated with the similar event from a cache;
otherwise:
simulating the event to determine characteristics associated with the event, and
storing the characteristics associated with the event in the cache.

12. The simulation method of claim 11, wherein determining whether the similar event has been previously simulated includes:
categorizing the event, and
determining whether a similarly categorized event has been previously simulated.

13. The simulation method of claim 12, wherein categorizing the event includes quantizing one or more factors underlying the event.

14. The simulation method of claim 12, wherein categorizing the event includes clustering components of the event.

15. The simulation method of claim 11, wherein the event corresponds to a communication from a transmitter to a receiver; and
determining whether the similar event has previously been simulated includes:
determining a transmitter cluster corresponding to the transmitter, and
determining a receiver cluster corresponding to the receiver; and
determining whether the characteristics are stored in the cache corresponding to a communication from the transmitter cluster and the receiver cluster.

16. The simulation method of claim 15, wherein determining the transmitter cluster and the receiver cluster is based on one or more factors underlying the event.

17. The simulation method of claim 15, wherein determining the transmitter cluster and the receiver cluster is based on one or more defined ranges of one or more factors underlying the event.

18. The simulation method of claim 15, wherein determining the transmitter cluster is based on an output power of the transmitter.

19. The simulation method of claim 15, wherein determining the receiver cluster is based on a location of the receiver relative to a location of the transmitter.

20. A computer-readable medium encoded with a computer program for execution on a computer system that causes the computer system to:
maintain a schedule of events to be simulated;
select an event from the schedule of events based on a simulated time;
determine whether the event is cache-related; and,
if the event is not cache-related:
simulate the event to determine characteristics related to the event; otherwise,
if the event is cache-related:
determine whether a similar event has previously been simulated; and
if the similar event has previously been simulated:
retrieve characteristics related to the similar event from a cache;
otherwise
simulate the event to determine characteristics related to the event, and store the characteristics related to the event in the cache; and schedule subsequent events based on the characteristics.

21. The computer-readable medium of claim 20, wherein the computer is further configured to determine whether the similar event has been previously simulated by:

categorizing the event, and determining whether a similarly categorized event has been previously simulated.

22. The computer-readable medium of claim 21, wherein the computer is further configured to categorize the event by quantizing one or more factors underlying the event.

23. The computer-readable medium of claim 21, wherein the computer is further configured to categorize the event by clustering components of the event.

24. The computer-readable medium of claim 20, wherein:

the event corresponds to a communication from a transmitter to a receiver; and the computer is further configured to:

determine whether the similar event has previously been simulated by:

determining a transmitter cluster corresponding to the transmitter, and determining a receiver cluster corresponding to the receiver; and determine whether the characteristics are stored in the cache corresponding to a communication from the transmitter cluster and the receiver cluster.

25. The computer-readable medium of claim 24, wherein the computer is further configured to determine the transmitter cluster and the receiver cluster based on one or more factors underlying the event.

26. The computer-readable medium of claim 24, wherein the computer is further configured to determine the transmitter cluster based on an output power of the transmitter.

27. The computer-readable medium of claim 24, wherein the computer is further configured to determine the receiver cluster based on a location of the receiver relative to a location of the transmitter.

* * * * *